(12) United States Patent
Stupac (10) Patent No.: US 9,712,036 B2
(45) Date of Patent: Jul. 18, 2017

(54) GENERATING ELECTRICITY FROM THE EARTH

(71) Applicant: Omer Stupac, Utica, NY (US)

(72) Inventor: Omer Stupac, Utica, NY (US)

( * ) Notice: Subject to any disclaimer, the term of this patent is extended or adjusted under 35 U.S.C. 154(b) by 396 days.

(21) Appl. No.: 14/229,873

(22) Filed: Mar. 29, 2014

(65) Prior Publication Data

US 2015/0280518 A1  Oct. 1, 2015

(51) Int. Cl.
*G01R 31/00* (2006.01)
*H02K 53/00* (2006.01)
*H02K 99/00* (2014.01)

(52) U.S. Cl.
CPC ............ *H02K 53/00* (2013.01); *H02K 99/10* (2016.11)

(58) Field of Classification Search
CPC .............................. H02K 57/003; H02K 53/00
USPC ................................ 324/96, 76, 76.11, 76.66
See application file for complete search history.

(56) References Cited

U.S. PATENT DOCUMENTS

| | | | | |
|---|---|---|---|---|
| 155,209 A | * | 9/1874 | Snow | H01M 14/00 429/47 |
| 406,968 A | | 7/1889 | Tesla | |
| 685,957 A | | 11/1901 | Tesla | |
| 2,181,601 A | * | 11/1939 | Jakosky | G01V 3/22 324/357 |
| 3,185,877 A | | 5/1965 | Sears | |
| 3,245,836 A | * | 4/1966 | Agruss | H01M 6/36 429/103 |
| 3,288,648 A | * | 11/1966 | Jones | H01M 8/00 166/248 |
| 3,471,394 A | * | 10/1969 | Sudrabin | G01N 27/301 204/435 |
| 4,502,028 A | * | 2/1985 | Leake | H01P 5/04 324/601 |
| 4,678,554 A | * | 7/1987 | Oppitz | A01G 7/04 204/290.11 |
| 4,923,151 A | * | 5/1990 | Roberts | B64G 1/648 244/158.2 |
| 5,451,825 A | | 9/1995 | Strohm | |

(Continued)

OTHER PUBLICATIONS

Southwire Co., Southwire 500 ft. 14-Gauge Stranded THHN Wire—Black, Model 22955957, Mar. 10, 2014, p. 1, www.homedepot.com, USA.

(Continued)

*Primary Examiner* — Giovanni Astacio-Oquendo
(74) *Attorney, Agent, or Firm* — Lawrence P. Trapani, Esq.

(57) ABSTRACT

A system for generating electricity from the geomagnetic field and rotation of the earth is presented. The earth rotates through the geomagnetic field to form a potential difference between first and second terrestrial charged bodies. The first and second charged bodies are spaced apart in a direction substantially normal to the earth's surface. The system comprises an electrical load, a first current path, and a second current path. The electrical load has a supply input and a ground output. The first current path is coupled to the first charged body and to the supply input of the electrical load, for supplying the potential difference to the electrical load. The second current path is coupled to the ground output of the electrical load and to the second charged body. As a result of this arrangement, an electric current related to the potential difference is generated in the electrical load.

17 Claims, 7 Drawing Sheets

(56) References Cited

U.S. PATENT DOCUMENTS

| | | | |
|---|---|---|---|
| 6,051,905 A * | 4/2000 | Clark | H02K 1/2706 310/178 |
| 6,297,730 B1 * | 10/2001 | Dickinson | H01R 13/6625 307/3 |
| 7,170,260 B2 | 1/2007 | Thrap | |
| 7,837,450 B2 | 11/2010 | Moreland | |
| 2003/0232599 A1 * | 12/2003 | Dostert | H04B 3/56 455/66.1 |
| 2004/0027022 A1 | 2/2004 | Weir | |

OTHER PUBLICATIONS

Chan, Marco S.W. et al., Effective Charging Method for Ultracapacitors, Journal of Asian Electric Vehicles, vol. 3, No. 2, Dec. 2006, pp. 771-775.

Maxwell Technologies, Charging of Ultracapacitors, Application Note, Document 1008981 Rev 1, Dec. 2005, pp. 1-5, Maxwell Technologies, Inc. San Diego, CA.

GHOST7584 (Forum Member), Free Electricity From Earth Rotation, SciForums.com/Free-Electricity-From-Earth-Rotation-t-44434.html, Dec. 4, 2008 (purported date of post, Jan. 25, 2005), pp. 1-6, web.archive.org/web/20081204124044/http://www.sciforums.com/Free-Electricity-From-Earth-Rotation-t-44434.html.

Valone, Thomas, The Homopolar Handbook, A Definitive Guide to Faraday Disk and N-Machine Technologies, 3rd Edition, Oct. 2001, pp. 2-4, 6-8, 24, 37, 49-53, 59-64, and 77-92, Integrity Research Institute, Washington, DC.

Stern, Dr. David P., #25c. The Space Tether Experiment, www-istp.gsfc.nasa.gov/Education/wtether.html, Nov. 2001, pp. 1-3, NASA.

Nichelson, Oliver, Tesla's Fuelless Generator, Jan. 1991, pp. 1-10, home.earthlink.net/~drestinblack/generator.htm.

Stupac, Omer, Production of Electrical Energy from Electromagnetic Induction Using Earth's Rotation, Submission to Office of Technology Innovation, National Institute of Standards and Technology (NIST), May 15, 1995, pp. 1-8, Ridgewood, NY.

NIST, Energy-Related Inventions Program, Report of First-Stage Evaluation (Response to Submission), Aug. 1995, pp. 1-3, NIST, Geithersburg, MD.

National Bureau of Standards, National Engineering Laboratory (NIST) Brochure, The NBS/DOE Energy-Related Inventions Program, Synopsis of Evaluation Process, U.S. Department of Commerce, Washington, DC, Reprinted Jan. 1980, pp. 1-4.

Valone, Thomas, The Homopolar Generator: Tesla's Contribution (from book, Harnessing the Wheelwork of Nature: Tesla's Science of Energy, by Thomas Valone, Dec. 31, 2004, pp. 271-88, Integrity Research Institute, Washinton, DC, Reprinted from Proceedings of International Tesla Symposium, Jan. 1986, pp. 6-29.

Carrigan, Charles R. and Gubbins, David, The Source of the Earth's Magnetic Field, Scientific American, Inc., vol. 240, Issue 2, Feb. 1, 1979, p. 118-128 & 130.

Elsasser, W.M., The Earth as a Dynamo, Scientific American, Inc., vol. 198, Issue 5, May 1, 1958, p. 44-48.

* cited by examiner

GENERATING ELECTRICITY FROM THE EARTH

BACKGROUND OF THE INVENTION

Field of Invention

The present invention relates generally to renewable electrical energy sources, and more particularly to apparatus and methods for generating electricity from the earth's magnetic field and rotation.

Background Art

The concepts of electromagnetic induction, Faraday's law, Faraday's disk, and the Lorentz force on charges are all well-known. These concepts have been applied to the earth, which is modeled as a large conductive sphere rotating through its own magnetic field ("geomagnetic field"). In this regard, the earth has been compared to a Faraday disk or homopolar generator. See, for example: W. M. Elsasser, The Earth as a Dynamo, Scientific American, Inc., Vol. 198, Issue 5, May 1, 1958, p. 44, 45; and C. R. Carrigan and D. Gubbins, The Source of the Earth's Magnetic Field, Scientific American, Inc., Vol. 240, Issue 2, Feb. 1, 1979, p. 118, 199-20. In making this comparison, the assumption has been carried over that the electricity to be obtained from the earth is from electromagnetic induction. Laboring under this assumption, it has been asserted that electricity from the geomagnetic field is not practicably retrievable, because the electricity gathering circuit would have to be stationary relative to the rotating earth (i.e., have a stationary frame of reference). This assertion is apparently based on a theory that the currents induced in the Faraday disk (or earth) and in the circuit employed to retrieve the electricity, would cancel each other out if both were moving through the magnetic field. Another theory is that a static electric field is created in the Faraday disk (or earth) that neutralizes the induced electric field, resulting in a zero voltage reading in the rotational frame of reference.

Further to this point, U.S. Patent App. Pub. No. 2004/0027022 (Feb. 12, 2004) to Weir, states that no voltage is generated by a Faraday type homopolar dynamo in the rotational reference frame of the dynamo (Weir, Par. [0010]). Weir even attempted to measure such voltage by mounting a voltmeter onto the rotating disk and connecting one probe to a shaft rotating the disk and the other probe to the rim of the disk. Weir states that the voltmeter read zero volts when the disk was rotating. (Weir Par. [0011].) No details are given regarding the sensitivity of the voltmeter or the test setup. In a book by Thomas Valone, Ph.D, P.E., entitled The Homopolar Handbook, published by Integrity Research Institute, Washington, D.C., 3rd Edition, October 2001 ("Valone I"), it is stated that an electrostatic field (created in response to the Lorentz force) neutralizes the electric field induced on the Faraday disk ("effective electric field"), and thus no voltage can be detected with a meter that rotates with the disk (Valone I, p. 7 & FIG. 8). Valone discusses his voltage measurement on page 24 and again at page 63. He indicates that his voltmeter was set to indicate a voltage reading only if the voltage was greater than 15 millivolts. Thus, the sensitivity of Valone's experiment may have been limited to 15 millivolts, presumably because the induced electric field (obtained in the stationary reference frame) was expected to be 100 millivolts (see Valone I, p. 63).

Valone reminds us that Michael Faraday, in 1831, compared his Faraday disk to the earth and the earth's rotation through its magnetic field. Valone states that Faraday, thinking that an induced voltage could be measured on his rotating disk, attempted to measure a like voltage in the earth (i.e., in rivers and streams) and apparently was unsuccessful. (Valone I, p. 61.) Valone characterizes Faraday's thinking as a mistake. Valone presumably mentions Faraday's unsuccessful attempt at measuring voltage in the earth as support for his position that a voltage cannot be measured in the rotating reference frame. In an earlier paper, entitled "The Homopolar Generator: Tesla's Contribution," Proceedings of the International Tesla Symposium, January 1986 ("Valone II"), Valone specifically stated that "we can't draw power from the earth's Homopolar generator while rotating with it." (Valone II, p. 273.)

Notwithstanding the view that a voltage is unobtainable in the rotating frame of reference in a Faraday system, proposals were made in the 1980s for a space shuttle to drag a tether (an insulated conductor) through space across the geomagnetic field to generate electric power onboard the shuttle. Current and a voltage potential difference would be induced on the tether's conductor as it passed through the magnetic field lines of the earth. The current return path (or ground path) would be the charged plasma medium of the ionosphere, which would exist between the outer wall of the space shuttle and the distal end of the tether (or an outer wall of a satellite attached to the distal end). A load (e.g., electronic equipment) inside the space shuttle would be connected between the proximal end of the tether and the outer wall of the shuttle (i.e., the return or ground path). A tether experiment was actually performed on a space shuttle mission in 1996, according to a NASA article (www.istp.gsfc.nasa.gov/Education/wtether.html). The voltage generated on the tether was 3500 volts, apparently measured in the rotational frame of reference. It is suggested that the voltage may have been measured at the distal end of the tether with instruments aboard a satellite connected to the distal end. The voltage level at the load inside the shuttle is not mentioned. In this experiment, the voltage applied to the intended load (equipment aboard the shuttle) was supplied by the tether's conductor and the return or ground path for the load was, according to NASA, the ionospheric plasma between the shuttle and the satellite.

An alternative design to the above-mentioned space tether was purportedly developed by or for the U.S. Army in 1988 and patented in U.S. Pat. No. 4,923,151 (1990) to Roberts. Roberts discloses a coaxial tether (Roberts, FIGS. 2 and 3) about 12.5 miles long, comprising an outer conductor 20, a magnetic shield conductor 26, and a center conductor 30. Outer conductor 20 is electrically connected at one end to a satellite 12 and at the other end to an orbiting shuttle 10 (Roberts, FIGS. 1 and 2). Center conductor 30 is magnetically shielded from the geomagnetic field by conductor 26, which is made of a high permeability metal such as soft iron. Center conductor 30 is electrically insulated from conductors 20 and 26 by insulation 28. Center conductor 30 is also electrically connected at one end to satellite 12 (at point 32) and at the other end to a load 36 inside shuttle 10 (through a switch 34). Load 36 is grounded via a return current path including the outer surface 40 of shuttle 10, conductor 20, and the outer surface 22 of satellite 12. The tether passes through the geomagnetic field at an orientation substantially normal to the earth and its magnetic field lines. As a result, a potential difference ("PD") is produced between shuttle 10 and satellite 12. Conductor 26 magnetically shields center conductor 30, so no induced current flows in conductor 30. Conductor 30 assumes the charge potential of satellite 12 and applies the potential difference PD across load 36 (once switch 34 is closed), causing current to flow in load 36. Conductor 20 replaces the ionosphere as the return current path, purportedly making the circuit more stable. Thus, conductor 20 functions both as a Faraday conductor (i.e., a conductor on which currents are induced from a magnetic field) and as the return current path. In this case, the Faraday conductor (conductor 20) does not function as the supply current path (conductor 30 does). In the previously discussed space tether design, the Faraday conductor (i.e., the tether's only conductor) did serve as the supply current path and did not serve as the return current path (the ionosphere).

For over 40 years, the inventor named herein has been working on an idea for generating electricity from the earth's rotation and magnetic field. The argument that electricity is generated in the earth is supported by some natural phenomena, including: the decreasing speed of the earth's rotation, the continued molten state of the earth's interior, volcanic and geyser activity, the earth's magnetic field, and lightning. The earth uses its primary kinetic energy, which originally started its rotation, to electrically charge itself by electromagnetic induction. Electric energy flowing toward the center of the earth is transformed into magnetic and heat energy, sustaining the earth's magnetic field and the molten state of the earth's interior. The balance in pressure between the surface and the molten interior is maintained through the loss of heat energy at the surface by heat radiation and volcanic and geyser activity. As a result of the work performed by the earth, and possibly because of a counter electromagnetic force (Lenz's law), the earth's kinetic energy is decreasing and its rotation is slowing.

The inventor herein began thinking about his idea while observing thunderstorms. In 1979, during one of his experiments, he was struck by a branch of lightning and luckily survived with no significant injury. He decided to continue experimentation, but in a safe manner. Upon arrival to the United States, the inventor herein applied for a grant and technical support from the National Institute of Standards and Technology (NIST) on May 18, 1995. His application was assigned an Evaluation Request (ER) Number 32042 and a Control Number 015351. The application was ultimately rejected with an explanation that the magnetic field rotates with the earth and thus currents could not be induced in a conductor installed on the earth. NIST's rejection of the idea dissuaded the inventor herein from pursuing the idea further, until recently when the inventor started thinking about the Faraday disk and "Faraday's paradox."

Faraday's paradox is the non-intuitive result that electric currents are induced in the Faraday disk even when the magnet rotates with the disk. It is non-intuitive because many would assume that the magnetic field rotates with the rotating magnet and disk, in which case currents would not be induced in the disk. Faraday conducted three tests to investigate this phenomenon. First, he rotated the disk and kept the magnet stationary and observed a current induced in the disk. Second, he kept the disk stationary and rotated the magnet and observed no induced current in the disk. Third, he rotated the disk and magnet together and observed a current in the disk. From these tests, Faraday concluded that the magnetic field remained stationary when the magnet was rotated around its own magnetic axis. Similarly, the earth (representing a rotating disk and magnet) should produced a stationary magnetic field through which the earth rotates, thus inducing generally radial electric currents in the earth and on conductors substantially aligned with the earth's radius. Since Faraday, there has been a long-standing debate and experimentation about Faraday's paradox and whether or not the magnetic field rotates with the magnet. For example, see Valone I, pp. 2-4 and 37. Notwithstanding the theoretical debate and investigation, it is believed that Faraday was correct and that currents are induced by the geomagnetic field in the earth, in the surrounding atmosphere, and in conductors appropriately located on the earth and in the atmosphere.

Nikola Tesla disclosed a conductor extending into the atmosphere and normal to the earth's surface in U.S. Pat. No. 685,957 (Tesla). Rather than seek to induce currents in the conductor from the geomagnetic field, Tesla sought to collect radiant energy (or particles charged by radiant energy) primarily from the sun. Tesla somehow suspended a conductive plate P and connected it to the distal end of the conductor (Tesla, FIG. 1). The proximal end of the conductor was connected to a capacitor C. The other end of capacitor C was connected to a secondary conductor, which is, in turn, connected to a conductive plate P' grounded in the earth. Plate P was the collector of radiant energy charged particles. The charge from plate P charged capacitor C. A voltage threshold device (d) and a load R are connected across capacitor C to form a circuit. Device (d) closes the circuit when the charge on capacitor C exceeds a predetermined voltage, causing the voltage to be applied to load R. In this patent, Tesla does not seek to obtain the potential difference between two "terrestrial charged bodies" (hereinafter defined).

Herein, the term "terrestrial" is used in a broad sense, to include the whole or any part of the earth and its surrounding atmosphere, including but not limited to: the earth's inner and outer cores, mantle, crust, any layer or level thereof, and its surface; all bodies of water; air; clouds; ice; vegetation; minerals and other resources such as oil; rocks including basalt; or any other composition or thing of the earth and its atmosphere. As used herein, the term "terrestrial charged body" (or its plural form) means a terrestrial body, region, layer, zone, other volume or area, any composition or thing, with or without specifically defined or fixed boundaries, having an electric charge represented by a voltage potential.

OBJECTS AND SUMMARY OF THE INVENTION

It is therefore an object of the present invention to overcome the problems and limitations associated with the prior art and to fulfill a long-felt but unsolved need for a renewable source of energy.

It is another object of the present invention to provide a clean and renewable source of electrical energy.

It is a further object of the present invention to generate electricity from the earth's magnetic field and rotation.

It is yet another object of the present invention to provide a reliable source of electricity from the earth's magnetic field and rotation.

It is yet a further object of the present invention to provide a source of electricity from the earth's magnetic field and rotation that can be easily implemented.

It is still another object of the present invention to provide a source of electricity from the earth's magnetic field and rotation that can be implemented at a low-cost.

These and other objects are attained in accordance with the present invention, wherein there is provided a system for generating electricity from the geomagnetic field and rotation of the earth. The earth rotates through the geomagnetic field to form a potential difference between first and second terrestrial charged bodies. The first and second terrestrial charged bodies are spaced apart in a direction substantially normal to the earth's surface. The system comprises an electrical load, an electrically insulated first current path, and a second current path. The electrical load has a supply input and a ground output. The first current path is coupled to the first terrestrial charged body and to the supply input of the electrical load, for supplying the potential difference to the electrical load. The second current path is coupled to the ground output of the electrical load and to the second terrestrial charged body. As a result of this arrangement, an electric current related to the potential difference is generated in the electrical load.

In one particular embodiment, the first terrestrial charged body includes a first portion of the earth located below the earth's surface and the second terrestrial charged body includes a second portion of the earth located at or near the earth's surface. The earth contains an opening extending between the first and the second portions of the earth. In this embodiment, the first current path includes (i) an electrically insulated conductor extending at least partially through the opening and (ii) a conductive contact member coupled to the electrically insulated conductor for establishing electrical contact between the first portion of the earth and the electrically insulated conductor. In a more specific embodiment, the opening is a well bore or mine shaft, and the first portion of the earth includes a bottom of a well or mine. The electrically insulated conductor extends through the bore or mine shaft, and the conductive contact member establishes electrical contact between the bottom of the well or mine and the electrically insulated conductor.

In another embodiment, the first terrestrial charged body may be a portion of the earth at or near the surface of the earth, and the second terrestrial charged body may be a cloud above the surface of the earth. In yet another embodiment, the first and second terrestrial charged bodies may be first and second charged portions of the earth, respectively, where both portions are located at or near the surface of the earth. In this latter embodiment, the first portion of the earth is at a first elevation and the second portion of the earth is at a second and different elevation. For example, the first elevation may be at or near the bottom of a mountain or cliff and the second elevation may be at an elevated position on the mountain or cliff. In still another embodiment, first terrestrial charged body is a portion of the earth at the bottom of a body of water, such as the ocean, and the second terrestrial charged body is the water at or near the surface of the body of water.

In any of the embodiments, the electrical load may include a rechargeable energy source, including a rechargeable battery or battery pack and a charging circuit coupled to the rechargeable battery or pack. Alternatively, or in addition to batteries, the rechargeable energy source may include a charging capacitor or a bank of charging capacitors along with an appropriate charging circuit for the capacitor(s). The capacitor or capacitors may be ultracapacitors. The electrical load may further include an electric motor coupled to the rechargeable energy source. The electric motor may be a DC motor, which may be mechanically coupled to an AC generator. In operation, the DC motor would actuate the AC generator, resulting in the AC generator generating AC electric power. Alternatively, the electric load may include an inverter for converting DC electric power to AC electric power. In either case (AC generator or inverter), the AC electric power can be stepped up in voltage and applied to an electric power grid.

A method of generating electricity from the geomagnetic field and rotation of the earth is also within the scope of the present invention. As indicated earlier, the earth rotates through the geomagnetic field to form a potential difference between first and second terrestrial charged bodies. The first and second terrestrial charged bodies are spaced apart in a direction substantially normal to the earth's surface. The method comprises the steps of: (a) providing an electrically insulated first current path having first and second electrically exposed ends; (b) coupling the first end of the first current path to the first terrestrial charged body to establish electrical communication between the first current path and the first terrestrial charged body; (c) coupling the second end of the first current path to a supply input of an electrical load to supply the potential difference to the electrical load; (d) providing a second current path having first and second ends; (e) coupling the first end of the second current path to a ground output of the electrical load; and (f) coupling the second end of the second current path to the second terrestrial charged body to establish electrical communication between the electrical load and the second terrestrial charged body. As a result of these steps, an electric current related to the potential difference is generated in the electrical load.

BRIEF DESCRIPTION OF THE DRAWING

Further objects of the present invention will become apparent from the following description of the preferred embodiments, with reference to the accompanying drawing, in which.

DETAILED DESCRIPTION OF THE PREFERRED EMBODIMENT

Figure 1:
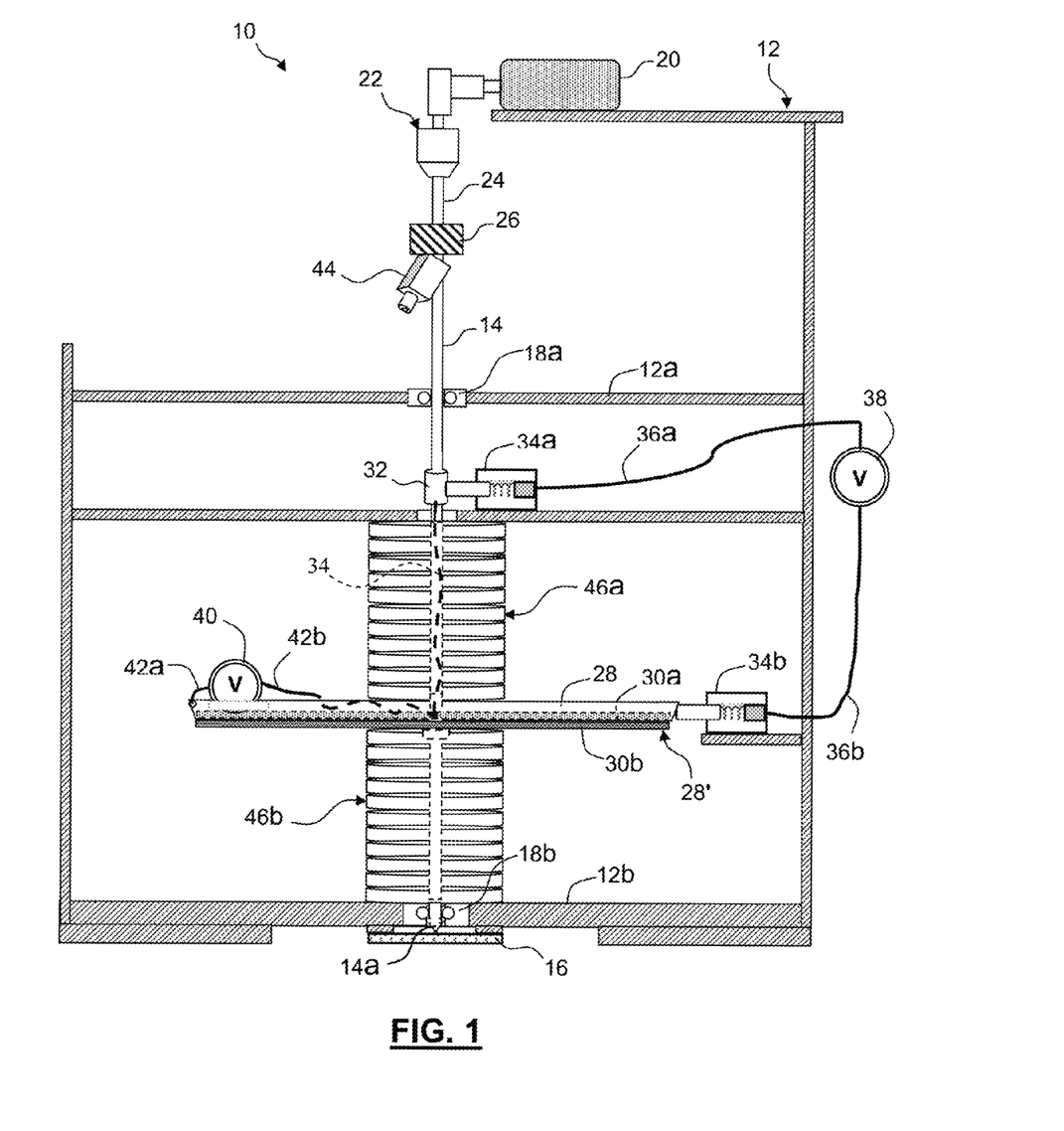
FIG. 1 is a diagram of a test setup used to demonstrate the operation of a Faraday disk and the generation of electricity within the rotational frame of reference.

Inspired by the book "The Homopolar Handbook" by Thomas Valone (Valone I), the named inventor built a Faraday disk to perform a few original experiments. A direct consequence of the experiments is the extraction and use of one part of the existing electrical energy of the earth. FIG. 1 illustrates a Faraday disk apparatus 10 built by the inventor herein. Apparatus 10 includes a frame 12 made of 2×6 wooden boards, connected together with screws. An axle 14 is made of a ⅝ inch diameter, 3-foot long steel threaded rod. Axle 14 has a sharpened lower end 14a, which rests on a steel plate 16. Axle 14 is rotatably supported by two bearing assemblies 18a and 18b. Bearing assembly 18a is mounted in an upper cross member 12a of frame 12 and bearing assembly 18b is mounted in a bottom cross member 12b of frame 12. A drill 20 is connected, via a chuck 22, to a short rod 24, which is, in turn, connected to one end of an insulator block 26. The upper end of axle 14 is connected to the other end of insulator block 26. Rod 24, block 26 and axle 14 rotate together as a unit. The speed of drill 20 is manually controlled to control the rotational speed of axle 14. Insulator 26 electrically isolates axle 14 from the drill to eliminate any chance of electric current from drill 20 finding its way into axle 14.

As further shown in FIG. 1, the actual Faraday disk comprises a 17-inch diameter round aluminum baking pan 28 and two 16-inch diameter (and ¼-inch thick) steel disks 30a and 30b. Pan 28 and disks 30a, 30b are fixed together and balanced on axle 14, using washers and steel hex nuts threaded on axle 14. Disk 30a is fixed in and against the bottom of pan 28 and disk 30b is fixed directly underneath and against pan 28 (collectively referred to as disk assembly 28'). Axle 14 and disk assembly 28' rotate together, almost like a spinning top. In order to reduce electrical resistance associate with axle 14 above disk assembly 28', a copper ring 32 is clamped to axle 14 and an insulated copper wire 34 is connected between ring 32 and disk assembly 28'. Two spring-loaded graphite brush contacts 34a and 34b are installed. Brush contact 34a is adjacent to and in contact with copper ring 32 and brush contact 34b is adjacent to and in contact with the rim of disk assembly 28'. Contact 34a and a lead wire 36a electrically connect ring 32 to one input of a digital voltmeter 38. Contact 34b and a lead wire 36b electrically connect the rim of disk assembly 28' to a second input of voltmeter 38. Voltmeter 38 is mounted outside of frame 12 and is held stationary. Another digital voltmeter 40 is mounted on disk assembly 28' and rotates with assembly 28'. Voltmeter 40 is electrically connected, via a short lead wire 42a, to the rim of disk assembly 28' and is electrically connected, via a longer lead wire 42b, to axle 14. A digital camera 44 is fixed on axle 14 (just below insulator block 26) to record the digitally displayed readings of voltmeter 40.

Again referring to FIG. 1, twenty-two cylindrical welding magnets, each five inches in diameter and each with a pull strength of 75 lbs, are arranged to form two magnetic cylinders 46a and 46b (11 magnets each). Cylinders 46a and 46b are separated from each other by disk assembly 28'. Magnetic cylinders 46a, 46b are installed in a way that allows them to be held stationary or to be rotated with disk assembly 28'. In a series of tests, axle 14 was rotated at a speed of about 200 RPM and voltmeter 38 measured and read a generated potential difference of about 300 millivolts. No difference in voltage generation was noted between tests where magnetic cylinders 46a, 46b were held stationary or rotated (Faraday's paradox). During the 200 RPM tests, voltmeter 40 read 1 to 3 millivolts, supporting the view that a voltage potential difference is generated and measurable on the rotating frame of reference. These tests are referred to collectively as "Experiment A." The difference in readings between voltmeter 38 and voltmeter 40 will be explained below.

Figure 2:
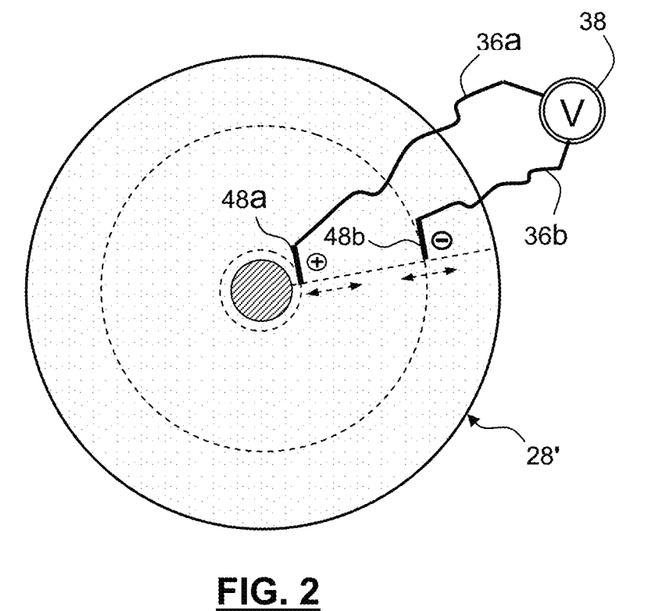
FIGS. 2 is a diagram of an experiment showing a rotating Faraday disk with a voltmeter having lead wires and test leads for measuring voltages at different points along the disk's radius.

Referring now to FIG. 2, a diagram of a rotating disk experiment is shown. Disk assembly 28' and voltmeter 38 are used in this experiment. Lead wires 36a and 36b of voltmeter 38 include test leads 48a and 48b, respectively. Leads 48a, 48b are placed on rotating disk assembly 28' in a sliding engagement to establish dynamic electrical contact with assembly 28'. As disk assembly 28' was rotated, voltage measurements were taken at different points along the radius of the assembly (i.e., at different imaginary concentric circles on disk assembly 28'). Voltmeter 38 measured the potential difference between the points of contact. The positive side of the potential difference is toward the center, as indicated in FIG. 2, due to the Lorentz force pushing electrons radially out to the rim. The measured potential difference increased as the distance between the contact points increased. This experiment is referred to hereinafter as "Experiment B."

Figure 3:
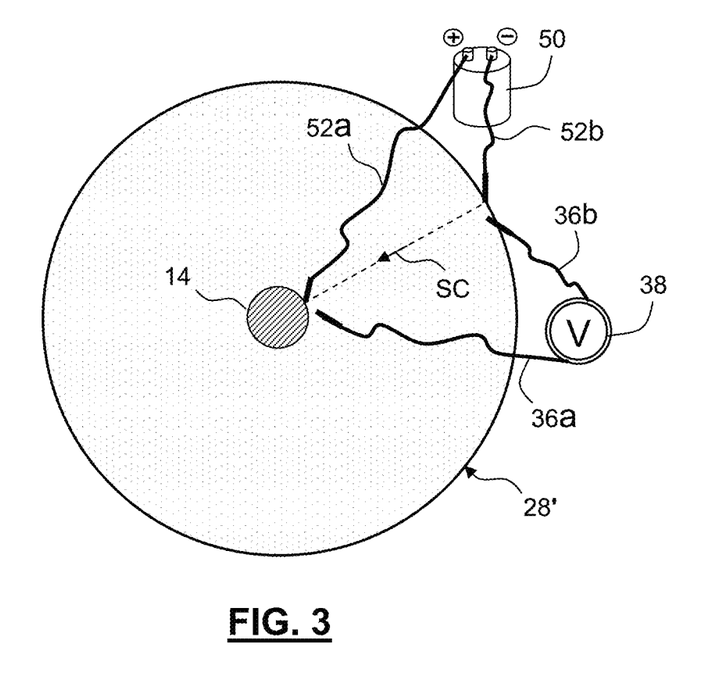
FIG. 3 is a diagram of an experiment illustrating a battery analogy of the Faraday disk and the concept of short circuit (SC) current on the disk.

An understanding as to why there is a difference in electric potential measured by voltmeter 38 and voltmeter 40 (FIG. 1) was gained in another experiment, illustrated in FIG. 3. In this experiment, an attempt was made to model the electrodynamics on a rotating Faraday disk. This was done by applying a potential difference across disk assembly 28' (between axle 14 and the rim), while disk assembly 28' remained stationary (as did voltmeter 38). This setup was intended to mimic the case where the voltmeter and disk are rotating in the same frame of reference. The potential difference was applied across disk assembly 28' using a 6-volt battery 50. This modeled the potential difference generated on a rotating disk by electromagnetic induction. Insulated copper wires 52a and 52b were connected to the terminals of battery 50 and to axle 14 and the rim of disk assembly 28', as shown in FIG. 3. The positive side of battery 50 is connected at axle 14 and the negative side is connected at the rim to model the charge displacement due to induction. Lead wires 36a, 36b of voltmeter 38 were also connected to disk assembly 28', in the vicinity of the connections of wires 52a, 52b, respectively. The voltage (or potential difference) measured by voltmeter 38 was 50 millivolts. A reading of 6 volts would be expected in an open circuit measurement. On the other hand, a reading of 50 millivolts would suggest a near short circuit (considering the inherent resistance in disk assembly 28'). Voltmeter 38 did measure a short circuit current, which is indicated in FIG. 3 by arrow SC. This experiment is referred to hereinafter as "Experiment C."

Based on Experiments A, B and C, it was concluded that the rotation of disk assembly 28' in the magnetic field (created by magnetic cylinders 46a, 46b—FIG. 1) caused the disk assembly to become charged and develop a potential difference in the radial direction. The potential difference increased as the distance between the center of disk assembly 28' and a measurement point along the radius of assembly 28' increased. This potential difference was created by the Lorentz force pushing electrons out to the rim, causing an induced current to flow radially outward. In response to the induced potential difference, electrons seek to establish equilibrium on the disk (as it is a conductor) and begin to flow in a direction opposite of the induced current. This opposite flow of electrons is referred to as the short circuit current and is indicated in FIG. 3 by arrow SC. It is believed that this short circuit current is flowing at all times on a rotating Faraday disk. This may be the reason why a voltage is measureable on the rotating frame of reference (voltmeter on the disk), albeit a smaller voltage than the induced voltage measured in the stationary frame of reference. A rotating Faraday disk (i.e., disk assembly 28') behaves like a battery (or multiple batteries connected in series) with one pole at the center of the disk (axle 14) and the other pole at the rim. While rotation in the magnetic field causes the disk to be charged, a short circuit simultaneously occurs. The disk loses its charge immediately when it stops rotating. A Faraday disk (and thus disk assembly 28') can be thought of as comprising a number of imaginary annular rings, each behaving like a circular-shaped battery and the batteries are connected in series. Thus, the largest potential would occur at the rim, where all of the annular rings (batteries) of the disk are in series and in the circuit.

Figure 4:
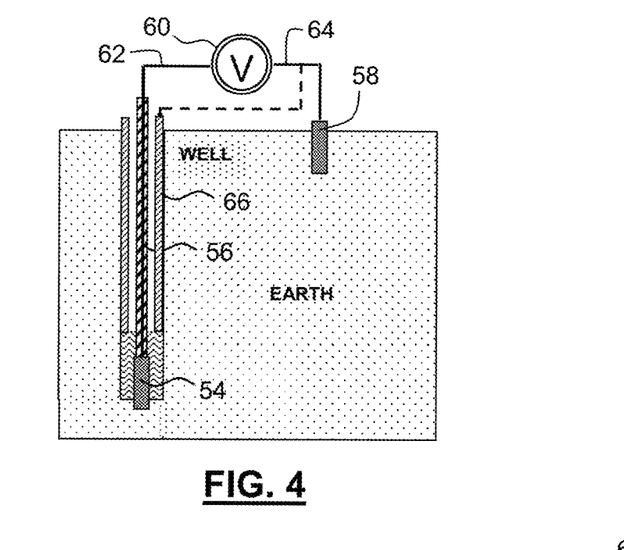
FIG. 4 is a diagram of a field experiment with one embodiment of the present invention, implemented in conjunction with a water well.

The concepts studied in the lab in Experiments A, B and C were then applied in the field, with respect to the earth's rotation and magnetic field. FIG. 4 illustrates an experiment that was conducted at two different drilled water wells, one 117 feet deep and the other 210 feet deep. The wells were drilled at construction sites of new homes in a suburban area near Utica, N.Y. At the time of the experiments, the wells were not in use. There were no electric power lines or transmitting antennas within a great distance around the construction sites. A copper pipe 54, one-half inch in diameter and two feet long, was connected to an insulated copper wire 56, to ensure a good connection with the earth at the bottom of the well. Pipe 54 and wire 56 were lowered to the bottom of each well. Pipe 54 made direct contact with the earth at the bottom of each well. The bottom of each well is considered a first charged body (defined above). Another one-half inch diameter and two-foot long copper pipe 58 was hammered into the ground at the surface, about 6 feet from the well. The surface and earth surrounding pipe 58 is considered a second charged body. A digital voltmeter 60 was used to measure the difference in electric potential between the bottom of the well and the surface of the ground (i.e., between the first and the second charged bodies). Voltmeter 60 has test lead wires 62 and 64. Test lead wire 62 is connected to insulated wire 56 and test lead wire 64 is connected to copper pipe 58. Steady measurements of 592 millivolts were obtained in the 117-foot well and 858 millivolts were obtained in the 210-foot well. Short circuit current between the surface and the bottom of the well was also measured with meter 60. As the distance between the surface and bottom of the well increased, the difference in electric potential increased.

A variation of the setup in FIG. 4 was also tested at the 210-foot well (indicated in dash lines). The well includes a metal bore casing 66 that extends substantially down the well bore. The variation is that casing 66 was used as part of the circuit instead of copper pipe 58. Test lead wire 64 was connected directly to casing 66. The voltage measurements were consistent with those obtained in the original tests for the 210-foot well. It is believed that the use of casing 66 as part of the circuit, instead of a ground pipe (like pipe 58), may yield more consistent voltage readings. The tests performed at both wells, as described in this and the previous paragraph, are collectively referred to hereinafter as "Experiment D." In the tests of Experiment D, wire 56 was an insulated 14-Gauge Stranded THHN Cable, Model No. 22955957, supplied by the Southwire Company, Carrollton, Ga., featuring conductors made of annealed (soft) copper, rated at 600 Volts, and insulated with tough, heat- and moisture-resistant PVC. Voltmeter 60 was a Mini Pocket MultiMeter, Model DM110, by Extech Instruments Corp., Nashua, N.H., with 0.1 millivolt DC voltage resolution and 0.01 milliamp DC current resolution. Another voltmeter was also used to re-confirm the readings. That meter was a Cen-Tech Seven Function Digital Multimeter, Model 98025, supplied by Harbor Freight Tools Co., Camarillo, Calif., with milliamp and millivolts resolutions.

Figure 5:
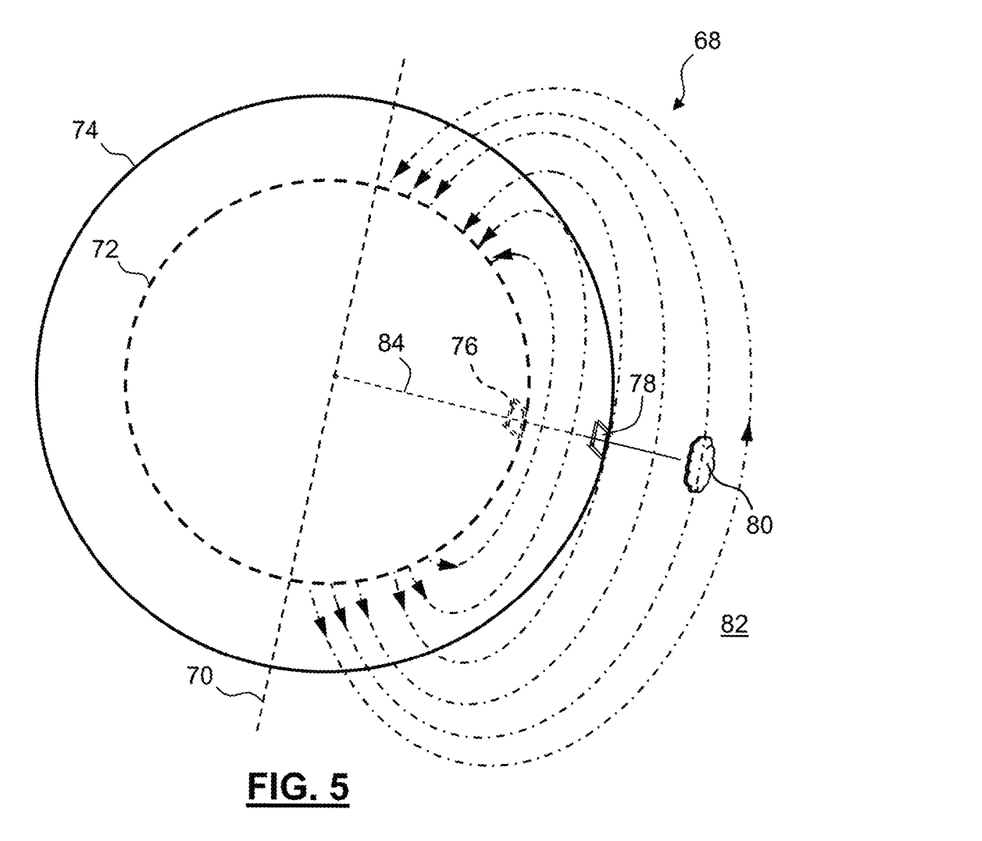
FIG. 5 is a diagram of the earth rotating through its magnetic field and showing (schematically) three terrestrial charged bodies spaced apart from each other in a direction normal to the earth's surface.

The earth is an oblate spheroid with an equatorial radius of 6378.16 km. The earth and its surrounding atmosphere rotate within the earth's magnetic field (i.e., the geomagnetic field). The speed of a point at the earth's equator is about 463.8 m/sec. In the Utica, N.Y. area, where Experiment D was performed, the speed is about 300 m/sec. By comparison, the speed of sound is 340.29 m/sec. The earth's magnetic field is estimated to be about 0.35 to 0.65 gauss at the earth's surface. By comparison, a strong refrigerator magnet has a field strength of 100 gauss. The geomagnetic field is generally dipolar as it has two poles, the north and south magnetic poles, and the field lines resemble those of a dipolar magnet. FIG. 5 illustrates the geomagnetic field on one side of the earth's magnetic axis 70. Generally, the earth can be considered a conductor having the following five parts: (1) the solid inner core, which is an excellent conductor; (2) the molten outer core, which is an excellent conductor; (3) the mantle, much of which is a good conductor; (4) the crust, which is a relatively good conductor; and (5) the atmosphere, which can be a good or poor conductor.

To help with the understanding of the results obtained in Experiment D and with the operation of the present invention, consider the following theory. (This theory should not be construed as defining or limiting the scope of the present invention in any way, and it should not affect the validity of the invention if proven to be incorrect. It is presented in the hope that it may aid in the understanding of the invention.) One should picture the earth and the surrounding (rotating) atmosphere as an endless number of concentric spheres, from the earth's center to the earth's surface, and from the earth's surface to the outer reaches of the surrounding, rotating atmosphere. FIG. 5 depicts two spheres associated directly with the earth itself. A sphere 72 represents any level or layer under the earth's surface between the center and the surface. For example, sphere 72 could be (generally) a junction between the earth's crust and its mantle, a junction between the earth's mantle and the outer core, or a particular layer within the earth's crust or mantle. A sphere 74 represents the earth's surface. Alternatively, one can picture the earth as an endless number of disks, with the largest diameter disk cutting through the equator (see FIG. 6) and the smallest diameter disks approaching the poles.

As shown in FIG. 5, the geomagnetic field (showing one side of the field) comprises a plurality of magnetic field lines 68 disposed generally in a dipolar arrangement about magnetic axis 70. As the earth rotates through the geomagnetic field, it behaves similar to a rotating Faraday disk, in that electrons dislocate outward from the center to the surface. This causes a potential gradient to be established along the radius of the earth and into the atmosphere, with the positive side toward the center and the negative side toward the surface. A potential difference is measured between any two designated spheres of the earth and atmosphere (e.g., spheres 72 and 74 in FIG. 5), and the potential difference increases with the spacing between the designated spheres. At the same time, electrons travel back toward the center of the earth as the electromagnetic system seeks equilibrium, and this causes a permanent short circuit current to flow in the earth's interior.

Continuing with the theory, induction also exists in the atmosphere, especially in the clouds. Clouds are connected to the earth's surface by air that is generally a poor conductor. Some short circuit current through dry air may exist, but a big difference in electric potential develops between clouds and the earth's surface. During storms, the air between the earth's surface and clouds, and between clouds at different levels (representing different spheres), become saturated with water and form columns that are relatively good conductors. An intense short circuit current occurs through such conductors. When the amount of current becomes so intense that the conductor cannot accept it any longer, because of its properties (air and water), it simply burns out. The flash and explosion (i.e., lightning and thunder) are results of the burning out of the overloaded conductor. Most likely, a similar event happened to NASA's tether experiment, when an almost 20 km long insulated wire burned out by an estimated 1 amp of current at 3500 volts (see NASA tether experiment article, www.istp.gsfc-.nasa.gov/Education/wtether.html).

Further with the theory, the earth behaves like one huge battery (similar to Faraday's disk), constantly being charged by the rotation within its own magnetic field. One pole of the battery is at the earth's center and the other pole is at the earth's surface or at some designated point in the atmosphere. One can also imagine the earth as an endless number of sphere-shaped batteries connected in series. At the same time, a permanent short circuit in the earth exists, like the battery in Experiment C above.

It is not possible or practicable to obtain the electric potential between the center of the earth and its surface using Faraday's approach, because stationary brush contacts cannot be placed at the center and the surface (i.e., a stationary frame of reference for the collection circuit cannot be established). However, it is possible to obtain an electric potential from the short circuit current between different designated spheres reachable from the earth's surface (e.g., Experiment D).

Referring again to FIG. 5, sphere 72 contains a designated terrestrial charged body 76 and sphere 74 (earth's surface) contains a designated terrestrial charged body 78. A cloud 80 in the atmosphere 82 is also designated as a terrestrial charged body. Terrestrial charged bodies 76, 78 and 80 are spaced apart from each other in a direction substantially normal to the earth's surface. An imaginary axis 84 represents the alignment of the charged bodies in a direction normal to the surface. Due to electromagnetic induction, a potential difference is formed between terrestrial charged bodies 76 and 78, between charged bodies 76 and 80, and between charged bodies 78 and 80. A terrestrial charged body is that amount (e.g., area or volume) of earth, water, minerals, rocks, clouds, etc. sufficient to define, accumulate or hold a charge which can produce a measurable potential difference with another terrestrial charged body.

Figure 6:
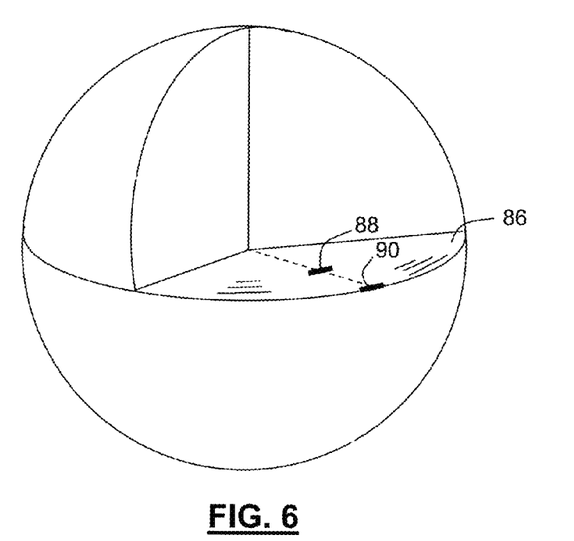
FIG. 6 is a diagram of the earth partially dissected to reveal a portion of a flat circular plane through the earth's equator, presented as an analogy of a Faraday disk.

Referring to FIG. 6, there is shown a model of the earth with a portion removed to reveal an imaginary plane or disk 86. Disk 86 cuts through the equator. FIG. 6 illustrates an analogy between the earth's interior and a Faraday disk (see earlier discussion above). In this example, an interior section or region of the earth's crust or mantle serves as a first terrestrial charged body 88, and the earth's surface serves as a second terrestrial charged body 90. Compare FIG. 6 with FIG. 2. The rotation of the earth through its magnetic field causes terrestrial bodies 88 and 90 to become charged and a potential difference to be form between them, as in Experiment B (FIG. 2).

Figure 7:
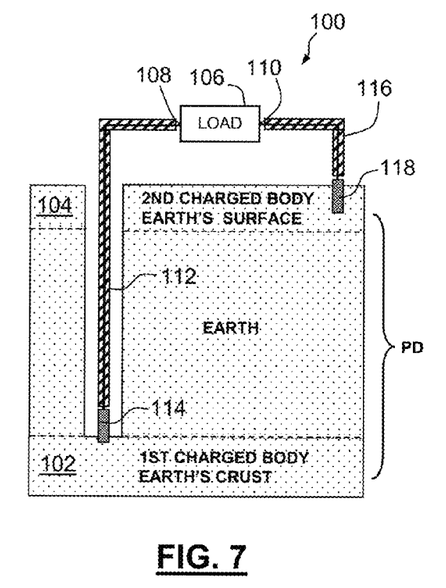
FIG. 7 is a diagram of a first embodiment of the present invention, wherein the terrestrial charged bodies are separated portions of the earth.

Referring now to FIG. 7, a system 100 for generating electricity from the geomagnetic field and rotation of the earth is shown as a first embodiment of the present invention. As explained, a potential difference (PD) is formed between terrestrial charged bodies—here terrestrial charged bodies 102 and 104. In this embodiment, body 102 is underground earth (e.g., rock, soil, and/or minerals, etc.) at the bottom of an opening or hole (man-made or natural) and body 104 is the surface soil of the earth. Charged bodies 102, 104 are spaced apart in a direction normal to the earth's surface. System 100 comprises an electrical load 106 having an input 108 and an output 110. A first insulated conductor 112 is coupled at one end to charged body 102 via a contact member 114 and is connected at its other end to load input 108. Contact member 114 may be, e.g., a short (e.g., 2 ft long) piece of copper or aluminum pipe. Conductor 112 is insulated to avoid direct electrical contact with the earth, except for charged body 102. Conductor 112 is soldered or otherwise electrically connected to contact member 114. The other end of conductor 112 is either directly connected to load input 108 (as shown) or is coupled to input 108 via a jumper wire and/or a connector. In FIG. 7, a first current path is defined between load 106 and body 102 by contact member 114 and conductor 112. The first current path supplies the PD to load 106. A second insulated conductor 116 is coupled at one end to charged body 104 via a contact member 118 and is connected at the other end to load output 110. Contact member 118 may be the same type as contact member 114. Conductor 116 may be the same type and model as conductor 112. A second current path is defined between load 106 and body 104 by conductor 116 and contact member 118. A return current path occurs between charged bodies 104, 102 via the intervening earth. Thus, a complete electrical circuit is established from charged body 102, contact member 114, conductor 112, load 106, conductor 116, contact member 118, charged body 104, and the return current path back to charged body 102. An electric current related to the PD is generated in load 106. Load 106 may comprise a charging circuit and a charge storage device, a motor, and/or an AC generator or inverter, as discussed later. Contact members 114, 118 may be any form of electrical conductor, including but not limited to a plate, disk, sphere, cone, rod, cylinder (hollow or solid), or sharp pointed member or members.

Figure 8:
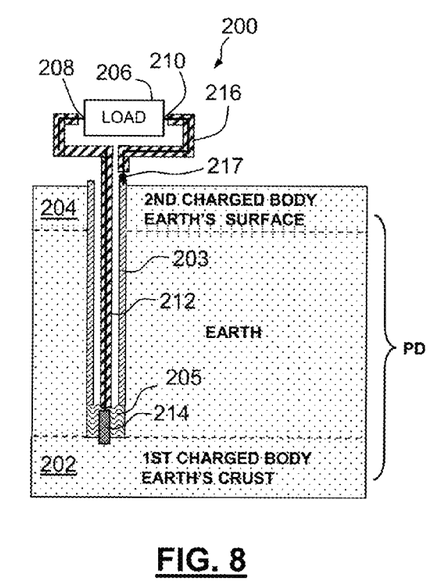
FIG. 8 is a diagram of a second embodiment of the invention, which is an implementation utilizing a well.

Referring now to FIG. 8, a system 200 for generating electricity from the geomagnetic field and rotation of the earth is shown as a second embodiment of the present invention. A potential difference PD is formed between spaced apart terrestrial charged bodies 202 and 204. Body 202 is underground earth at the bottom of a well and body 204 is the surface soil of the earth. The well includes a drilled wellbore extending from the earth's surface to the well bottom. A metal casing 203 extends down into the bore. At the bottom of the well is a supply of water 205. System 200 comprises an electrical load 206 having an input 208 and an output 210. A first insulated conductor 212 is coupled at one end to charged body 202 via a contact member 214 and is connected at its other end to load input 208. Contact member 214 may be submerged in water 205. Conductor 212 is insulated to avoid direct electrical contact with metal casing 203 and the earth, except for charged body 202. A first current path is defined between load 206 and body 202 by conductor 212 and contact member 214. This current path supplies the PD to load 206. A second insulated conductor 216 is coupled at one end to charged body 204 via a connection (e.g., a solder joint) 217 to casing 203. Conductor 216 is connected at its other end to load output 210. A second current path is defined between load 206 and body 204 by conductor 216, connection 217 and casing 203. A return current path occurs between charged bodies 204, 202 via casing 203 and the earth (and/or water 205). Thus, a complete electrical circuit is established from charged body 202, contact member 214, conductor 212, load 206, conductor 216, connection 217, casing 203, charged body 204, and the return current path back to charged body 202. An electric current related to the PD is generated in load 206. In this embodiment, it is preferred that the bottom of the well be at least 400 feet deep relative to the surface.

Figure 9:
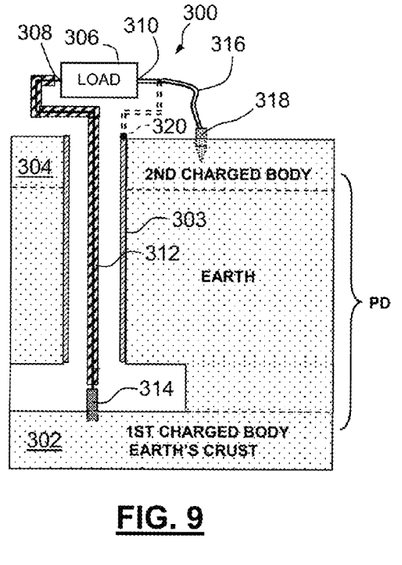
FIG. 9 is a diagram of a third embodiment of the invention, which is an implementation utilizing a mine and a mine shaft.

Referring now to FIG. 9, a system 300 for generating electricity from the geomagnetic field and rotation of the earth is shown as a third embodiment of the present invention. A potential difference PD is formed between spaced apart terrestrial charged bodies 302 and 304. In this embodiment, body 302 is underground earth at a bottom of a mine and body 304 is the surface soil of the earth. The mine contains a drilled or excavated opening or mineshaft extending from the earth's surface to the bottom. A metal frame 303 may be present in the shaft. System 300 comprises an electrical load 306 having an input 308 and an output 310. A first insulated conductor 312 is coupled at one end to charged body 302 via a contact member 314 and is connected at its other end to load input 308. Contact member 314 makes direct contact with the bottom of the mine and, in some cases, may slightly penetrate the bottom. Conductor 312 is insulated to avoid direct electrical contact with frame 303 and/or the earth (except for charged body 302). A first current path is defined between load 306 and body 302 by conductor 312 and contact member 314. The first current path supplies the PD to load 306. A second insulated conductor 316 is coupled at one end to charged body 304 via a contact member 318 and is connected at its other end to load output 310. Contact member 320 has been driven into the earth to make good electrical contact with body 304. Alternatively, conductor 316 may be coupled to body 304 via a connection (e.g., a solder joint) 320 to metal frame 303 (if any). A second current path is defined between load 306 and body 304 by conductor 316 and contact member 318 (or by conductor 316, connection 320 and frame 303). A return current path occurs between charged bodies 304, 302 via the earth or, alternatively, via frame 303 and the earth. Thus, a complete circuit is established from charged body 302, contact member 314, conductor 312, load 306, conductor 316, contact member 318 (or connection 320 and frame 303), charged body 304, and the return current path back to charged body 302. An electric current related to the PD is generated in load 306.

Figure 10:
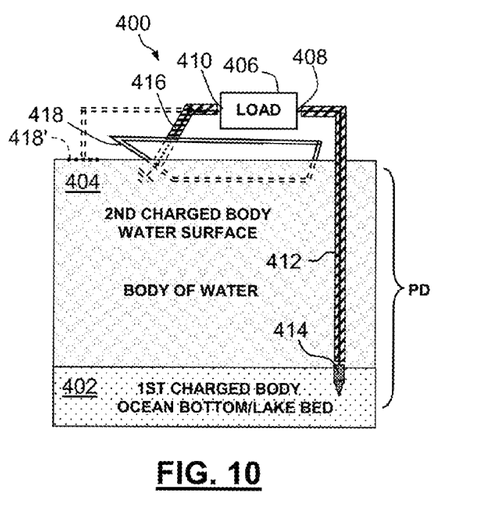
FIG. 10 is a diagram of a fourth embodiment of the invention, which is an implementation utilizing a body of water, wherein one terrestrial charged body is the bottom of the body of water and another terrestrial charged body is a surface of the body of water.

Referring now to FIG. 10, a system 400 for generating electricity from the geomagnetic field and rotation of the earth is shown as a fourth embodiment of the present invention. A potential difference PD is formed between spaced apart terrestrial charged bodies 402 and 404. In this embodiment, charged body 402 is the bottom or bed of a body of water (e.g., the earth's crust, basalt, sand, clay, sediments or other settled materials, a change in salinity, etc.). Charge body 404 is the water at or near the surface of the body of water. The body of water is preferably a salt water system such as an ocean, sea, ocean bay, strait, estuary, lake, and the like. System 400 comprises an electrical load 406 having an input 408 and an output 410. A first insulated conductor 412 is coupled at one end to charged body 402 via a contact member 414 and is connected at its other end to load input 408. Contact member 414 makes direct contact with the bottom and, in some cases, may penetrate the bottom. Conductor 412 is insulated to avoid direct electrical contact with the body of water. A first current path is defined between load 406 and body 402 by conductor 412 and contact member 414. The first current path supplies the PD to load 406. A second insulated conductor 416 is coupled at one end to charged body 404 via a metal boat 418, which serves as a contact member. Conductor 416 is connected at its other end to load output 410. Conductor 416 is directly connected to boat 418, as represented by the electrical ground symbol. An alternative contact member may be a thin metal (e.g., copper or aluminum) plate 418', which floats on the water. In the latter case, conductor 416 is directly connected to plate 418'. A second current path is defined between load 406 and body 404 by conductor 416 and boat 418 (or by conductor 416 and plate 418'). A return current path occurs between charged bodies 404, 402 via the body of water. Thus, a complete circuit is established from charged body 402, contact member 414, conductor 412, load 406, conductor 416, boat 418 or other contact member, charged body 404, and the return current path back to charged body 402. An electric current related to the PD is generated in load 406.

Figure 11:
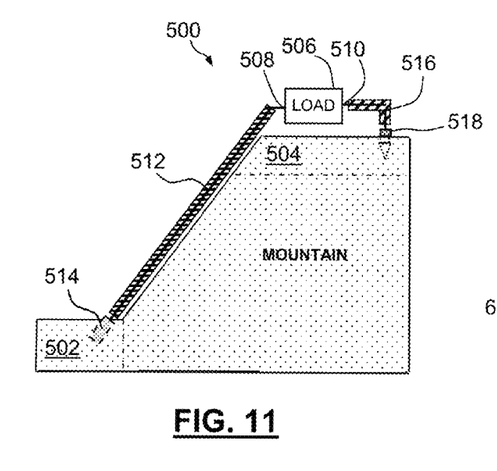
FIG. 11 is a diagram of a fifth embodiment of the invention, which is an implementation utilizing different elevations of the earth's surface, such as associated with a mountain or cliff.

Referring now to FIG. 11, a system 500 for generating electricity from the geomagnetic field and rotation of the earth is shown as a fifth embodiment of the present invention. A potential difference PD is formed between spaced apart terrestrial charged bodies 502 and 504. In this embodiment, both charged bodies 502, 504 are portions of the earth at or near the earth's surface, but body 504 is at a higher elevation than body 502. This may be the case, for example, at a mountain or cliff System 500 comprises an electrical load 506 having an input 508 and an output 510. A first insulated conductor 512 is coupled at one end to charged body 502 via a contact member 514 and is connected at its other end to load input 508. Contact member 514 is driven into the earth to establish good electrical contact with charged body 502. Conductor 512 is insulated to avoid direct electrical contact with the earth. A first current path is defined between load 506 and body 502 by conductor 512 and contact member 514. The first current path supplies the PD to load 506. A second insulated conductor 516 is coupled at one end to charged body 504 via a contact member 518 and is connected at its other end to load output 510. Member 518 has been driven into the earth to make good electrical contact with body 504. A second current path is defined between load 506 and body 504 by conductor 516 and contact member 518. A return current path occurs between charged bodies 502, 504 via the intervening earth. Thus, a complete circuit is established from charged body 502, contact member 514, conductor 512, load 506, conductor 516, contact member 518, charged body 504, and the return current path back to charged body 502. An electric current related to the PD is generated in load 506.

Figure 12:
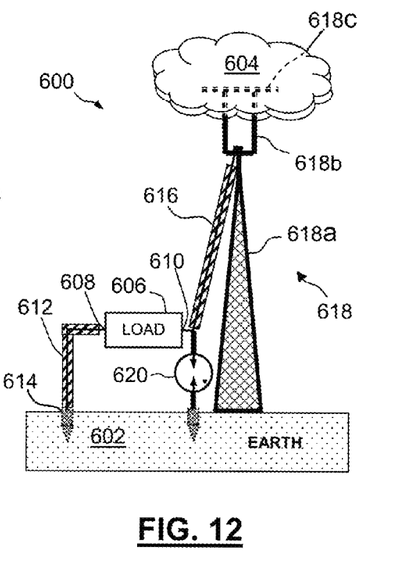
FIG. 12 is a diagram of a sixth embodiment of the invention, which is an implementation utilizing the atmosphere of the earth, wherein one terrestrial charged body is a cloud and another terrestrial charged body is a surface of the earth.

Referring now to FIG. 12, a system 600 for generating electricity from the geomagnetic field and rotation of the earth is shown as a sixth embodiment of the present invention. A potential difference PD is formed between spaced apart terrestrial charged bodies 602 and 604. In this embodiment, charged body 604 is a cloud or a stream of clouds passing overhead and charged body 602 is a portion of the earth at or near the earth's surface. A preferred location for system 600 is at a high elevation, such as a mountain top, where low lying clouds are a frequent occurrence. As air is generally a poor conductor, the flow of short circuit current between clouds and the earth's surface is very limited, resulting in the buildup of a huge difference in electrical potential between the clouds and the earth's surface. THIS EMBODIMENT IS VERY DANGEROUS DUE TO LIGHTNING STRIKES AND STATIC ELECTRICITY. ANYONE WHO BUILDS THIS EMBODIMENT, WHETHER AUTHORIZED BY THE INVENTOR HEREIN OR NOT, ASSUMES ALL RISK OF PERSONAL INJURY OR DEATH AND ASSUMES ALL LIABILITY TO OTHERS INJURED OR KILLED AS A RESULT OF THE CONSTRUCTION AND/OR OPERATION OF THIS EMBODIMENT.

Again referring to FIG. 12, system 600 comprises an electrical load 606 having an input 608 and an output 610. A first insulated conductor 612 is coupled at one end to charged body 602 via a contact member 614 and is connected at its other end to load input 608. Contact member 614 has been driven into the earth to make good electrical contact with body 602. A first current path is defined between load 606 and body 602 by conductor 612 and contact member 614. The first current path supplies the PD to load 606. A second insulated conductor 616 is coupled at one end to charged body 604 via a contact apparatus 618 and is connected at its other end to load output 610. Apparatus 618 includes a non-conductive tower 618a, an upwardly extending metal bracket 618b, and a metal collector plate 618c. Tower 618a is preferably built from a non-conductive material such as, for example, wood, fiberglass, fiberglass reinforced plastic, and the like. Tower 618a may be supported by non-conductive guy wires such as Phyllistran guys or Polygon structural fiberglass guys. Alternatively, tower 618a may be electrically insulated from the ground using an electrically insulating barrier between the tower and the ground. Conductor 616 is electrically connected to metal bracket 618b. Conductor 616 is insulated to avoid electrical contact with the surrounding atmosphere. Bracket 618b and collector plate 618c establish electrical coupling with the electric charge in cloud 604. Plate 618c is a metal sheet of metal, such as copper or aluminum. A second current path is defined between load 606 and body 604 by conductor 616, metal bracket 618b, and collector plate 618c. A return current path occurs between charged bodies 604, 602, via the atmosphere or moisture or precipitation in the atmosphere. Thus, a complete circuit is established from charged body 602, contact member 614, conductor 612, load 606, conductor 616, bracket 618b, collector plate 618c, charged cloud 604, and the return current path back to charged body 602. An electric current related to the PD is generated in load 606.

As mentioned, the hazards of lightning are obviously a major concern in system 600. Lightning protection schemes are not infallible and no representation is made herein that system 600 is safe from the hazards of lightning strikes or static electricity. In system 600, a surge arrester device 620 is installed between load output 610 and ground (FIG. 12). Device 620 is shown as a gas-filled surge arrester, but the preferred arrester is a spark gap rated for lightning strike voltages. Preferably, conductor 616 is a high voltage stranded single conductor cable, such as used to connect lightning rods to grounding rods, but covered with insulation having a high dielectric strength to withstand lightning strikes.

An alternative embodiment to system 600 (not shown) is to replace apparatus 618 with a hydrogen- or helium-filled balloon (e.g., a weather balloon). The balloon would have a conductor such as copper or aluminum foil wrapped around it or a metal plate or band mounted on it. In this embodiment, insulated conductor 616 would be electrically connected to the conductor on the balloon. This embodiment would otherwise be the same as system 600. The warnings and disclaimers made above with respect to system 600 are equally applicable to this embodiment.

Figure 13:
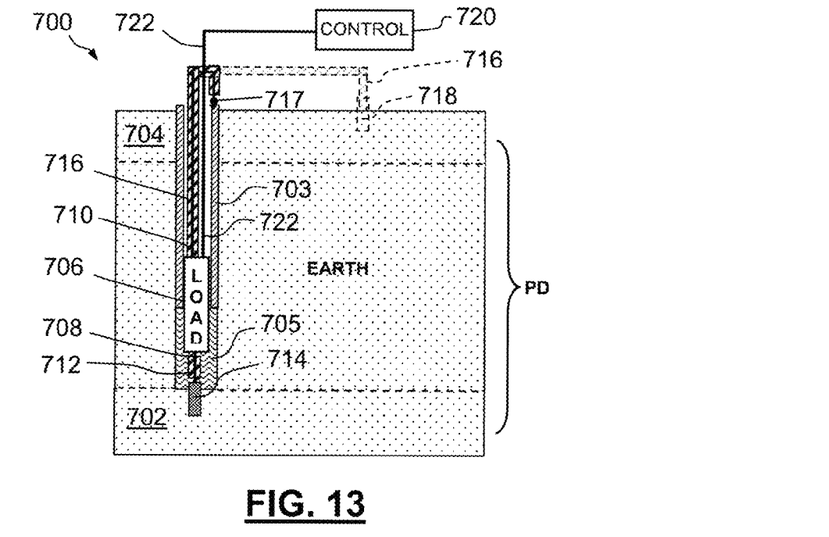
FIG. 13 is a diagram of a seventh embodiment of the invention, which is an implementation utilizing a well having a bore casing and an electrical load (which may include a submersible pump) is located at least partially within the bore casing.

Referring now to FIG. 13, a system 700 for generating electricity from the geomagnetic field and rotation of the earth is shown as a seventh embodiment of the present invention. This embodiment concerns a well and is fundamentally the same as the second embodiment, except here the electrical load is located down in the wellbore. A potential difference PD is formed between terrestrial charged bodies 702 and 704 (i.e., bottom of well and earth surface). The well includes a drilled bore and a metal casing 703 extending down into the bore. At the bottom of the well is a supply of water 705. An electrical load 706 has an input 708 and an output 710. A first insulated conductor 712 is coupled at one end to charged body 702 via a contact member 714 and is connected at its other end to load input 708. A first current path is defined between load 706 and body 702 by conductor 712 and contact member 714. The first current path supplies the PD to load 706. A second insulated conductor 716 is coupled at one end to charged body 704 via an electrical connection (e.g., a solder joint) 717 to metal casing 703. The other end of conductor 716 is connected to load output 710. A second current path is defined between load 706 and body 704 by conductor 716, connection 717 and casing 703. A return current path occurs between charged bodies 704, 702, via casing 703 and the earth (and/or water 705). Thus, a complete electrical circuit is established from charged body 702, contact member 714, conductor 712, load 706, conductor 716, connection 717, casing 703, charged body 704, and the return current path back to charged body 702. An electric current related to the PD is generated in load 706. In the case where casing 703 is not made of electrically conductive material, an alternative coupling arrangement with charged body 704 is: conductor 716 is connected to a contact member 718, which is driven into the ground at the earth's surface.

Load 706 may contain a charge storage system and a wellbore submersible pump controlled by a control unit 720. The charge storage system stores electricity generated by system 700 and supplies the stored electricity to the pump when called upon by control unit 720. Control unit 720 communicates with the pump via a control cable 722. Control unit 720 includes an auto-control function that controls the pump automatically. Unit 720 switches on the power to the pump by means of a pressure switch actuated in response to a pressure valve or by means of a float level switch actuated by a float. An example of a submersible pump powered by a renewable electrical energy source is disclosed in U.S. Pat. No. 7,837,450, which is incorporated herein by reference.

Figure 14:
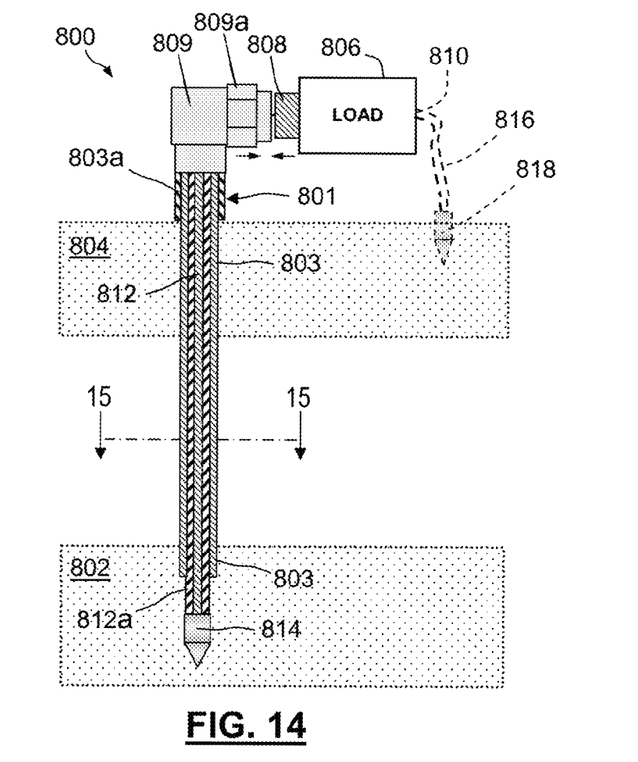
FIG. 14 is a diagram of an eighth embodiment of the invention, which employs coaxial conductors to carryout the invention.
Figure 15:
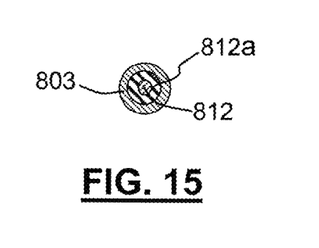
FIG. 15 is a cross-sectional view of the coaxial conductors of FIG. 14, taken along line 15-15 in FIG. 14.

Referring now to FIGS. 14 and 15, a system 800 is another embodiment of the present invention. This embodiment is characterized by a coaxial cable 801 installed between two spaced apart, substantially parallel, terrestrial charged bodies 802 and 804. Cable 801 includes a copper (or copper-clad steel) center conductor 812 insulated by a dielectric insulating material 812a, such as cellular polyurethane, polyurethane foam or solid polyethylene. Cable 801 further includes an outer shield conductor 803, which may be a woven braid of bare or tinned copper wires, a wrap of aluminum foil tape, a solid copper or aluminum tube, or a combination thereof. Shield conductor 803 may be insulated or left uninsulated. In FIGS. 14 and 15, conductor 803 is insulated generally by a jacket 803a made of plastic, such as polyvinyl chloride (PVC). When cable 801 is installed, jacket 803a is preferably removed between charged bodies 802 and 804, as shown in FIG. 14. System 800 comprises an electrical load 806 having a supply input and a ground output made available at a threaded female coaxial connector 808. Cable 801 has a finished proximal end with a threaded male coaxial connector 809. Connector 809 is considered male because it has a stinger wire, which is to be inserted into connector 808. The stinger wire is connected to or an extension of center conductor 812. Connector 809 includes a threaded slip ring 809a for threading connector 809 onto connector 808.

Once connectors 808 and 809 are connected together, center conductor 812 is in electrical contact with the supply input of load 806 and shield conductor 803 is in electrical contact with the ground output of load 806. Center conductor 812 is electrically coupled to charged body 802 via a metal contact member 814. Conductor 812 delivers the potential difference between charged bodies 802, 804 to load 806. Shield conductor 803 is electrically coupled to charged body 804 by direct contact as shown. Thus, the ground output of load 806 is electrically coupled to charged body 804. Conductor 803 is also coupled to charged body 802 by direct contact as shown. Alternatively, conductor 803 may be in direct contact with a portion of the earth defined to be outside of charged body 802 (thus making indirect contact with body 802). A return current path occurs between charged bodies 802, 804 primarily through shield conductor 803. Using conductor 803 as the return current path improves return path performance by making the path easier to implement and maintain, and it operates more predictably because it is not dependent on the variable properties and conditions of earth, water, atmospheric, and other natural or in situ return current paths. In system 800, a complete electrical circuit is established from charged body 802, contact member 814, center conductor 812, load 806 (via connectors 809/808), shield conductor 803 (via connectors 808/809), charged body 804, and shield conductor 803 back to charged body 802. An electric current related to the PD between charged bodies 802, 804 is generated in load 806.

As shown in FIG. 14, an alternative or additional ground output 810 is provided in electrical load 806. An insulated conductor 816 is connected to output 810 and to a contact member 818. In this case, shield conductor 803 may be decoupled from the original ground output, for example, by operation of an automatic impedance sensing switch internal to load 806. Optionally, both outputs (810 and original output via 803) may be in operation together. In connection with output 810, the return current path remains primarily through shield conductor 803. The complete electrical circuit is from charged body 802, contact member 814, center conductor 812, load 806 (via connectors 809/808), conductor 816, contact member 818, charged body 804, and shield conductor 803 back to charged body 802.

Figure 16:
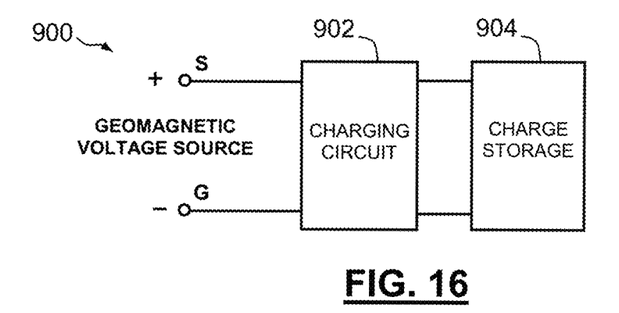
FIG. 16 is a block diagram of one example of an electrical load of the present invention, which is a rechargeable energy source including a charging circuit and a charge storage device, such as a rechargeable battery(s) or storage capacitor (s)

Referring now to FIG. 16, there is shown one example of an electrical load 900 of the present invention. A supply input S and a ground output G of load 900 correspond to, for example, load input 108 and load output 110, respectively (e.g., see FIG. 7). The potential difference between a pair of terrestrial charged bodies, obtained in accordance with the present invention, is presented across terminals S and G of load 900. The apparatus of the present invention that obtains this potential difference (examples of which are shown in FIGS. 7-14) is referred to in FIGS. 16-18 as a geomagnetic voltage source. Load 900 includes a charging circuit 902 and a charge storage system 904. The specifics of charging circuit 902 depend upon the type of charge storage system used. System 904 may be, for example, a rechargeable battery or series of batteries or a charging capacitor or bank of charging capacitors. A basic charging circuit for a rechargeable battery (or series of batteries) may be a positive going diode in series with a source resistor, and both in series with the rechargeable battery (or series of batteries). A basic charging circuit for a capacitor (or bank of capacitors in series) may be an inductor in series with the capacitor (or bank of capacitors). The latter circuit typically includes a switching element or elements to cause the geomagnetic voltage source to charge the inductor in a first switched state and to cause the charged inductor to charge the capacitor or capacitors in a second switched state. If capacitors are used for the charge storage elements, a preferred form of capacitor is the ultracapacitor. Ultracapacitors and their charging circuits are disclosed in the following references: M. S. W. Chan, K. T. Chau, and C. C. Chan, Effective Charging Method for Ultracapacitors, Journal of Asian Electric Vehicles, Vol. 3, No. 2, December 2006, pp. 771-76; and Maxwell Technologies Application Note, Document 1008981 Rev 1, December 2005, pp. 2-3. The disclosures of these references are incorporated herein by reference. See also U.S. Pat. No. 7,170,260 to Thrap (Maxwell Technologies), entitled, Rapid Charger for Ultracapacitors, which is incorporated herein by reference.

Figure 17:
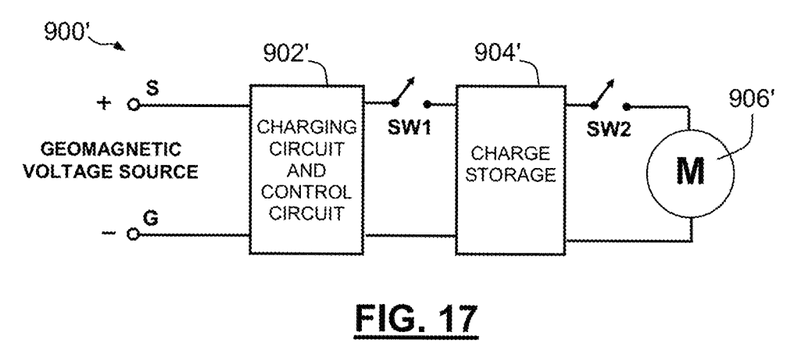
FIG. 17 is a block diagram of another example of an electrical load of the invention, which includes a charging and control circuit, charge storage device, and an electric motor.

Referring now to FIG. 17, there is shown another example of an electrical load 900' of the present invention. Load 900' has a supply input S and a ground output G, as with load 900. A geomagnetic voltage source of the present invention is applied to terminals S and G. Load 900' includes a charging and control circuit 902', a charge storage system 904', and an electric motor 906'. Blocks 902' and 904' contain the same types of charging circuits and charge storage elements as in blocks 902 and 904 (FIG. 16), respectively. Circuit 902' further includes a control circuit or IC chip that controls the operation of switches SW1 and SW2 in FIG. 17. In a first operating stage, switch SW1 is closed and switch SW2 is open, and the geomagnetic voltage source and circuit 902' charge the storage element or elements of charge storage system 904'. In a second operating stage, switch SW1 is open (or sometimes remains closed) and switch SW2 is closed, and system 904' powers electric motor 906'. Motor 906' is typically a DC motor, but may be an AC motor if, e.g., an inverter is installed between the output of system 904' and the motor. It is understood that, in an alternative embodiment, load 900' may simply consist of motor 906', which would be directly driven by the geomagnetic voltage source.

Figure 18:
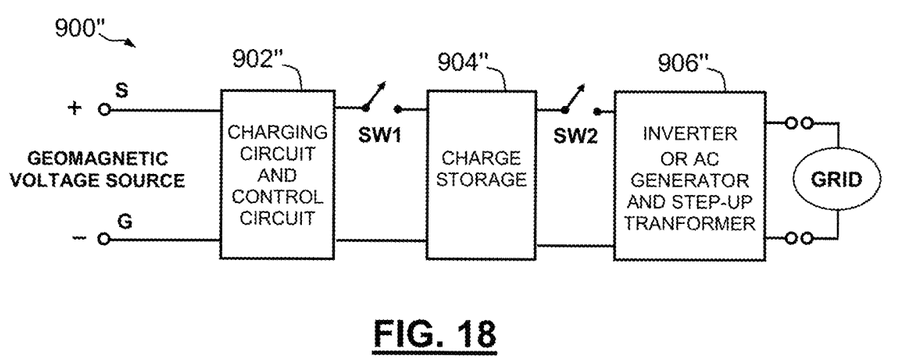
FIG. 18 is a block diagram of a further example of an electrical load of the present invention, including a charging and control circuit, a charge storage device, and an inverter or AC generator with step-up transformer.

Referring now to FIG. 18, there is shown a further example of an electrical load 900" of the present invention. Load 900" has a supply input S and a ground output G, as with loads 900 and 900'. A geomagnetic voltage source of the present invention is applied to terminals S and G. Load 900" includes a charging and control circuit 902", a charge storage system 904", and an inverter or AC generator with step-up transformer 906". Blocks 902" and 904" contain the same types of circuits and charge storage elements as in blocks 902' and 904' (FIG. 17), respectively. In a first operating stage of load 900", switch SW1 is closed and switch SW2 is open, and the geomagnetic voltage source and circuit 902" charge the storage element or elements of charge storage system 904". In a second operating stage, switch SW1 is open (or sometimes remains closed) and switch SW2 is closed, and system 904" powers inverter or AC generator with step-up transformer 906". If an inverter, block 906" directly converts the DC voltage from block 904" to AC voltage and steps up the voltage to a desired level. If an AC generator, block 906" includes a DC motor for driving the AC generator and a step-up transformer raises the voltage to a desired level. In the latter case, block 904" drives the DC motor, which in turn drives the AC generator. The desired level of AC voltage may be at the mains level so that it can be applied to the electric power grid, for contributing power to the grid. FIG. 18 shows the output of block 906" being applied to an electric power grid.

The phrases, "earth's surface" and "the surface of the earth," when speaking about orientation or relative position (e.g., "a direction normal to the earth's surface"), mean the general or averaged plane of the surface if observed locally or the general tangent of the surface if observed from space. In addition, these phrases are to be construed broad enough to include the surface of any body of land, water or ice or any geological formation such as, e.g., a mountain top or slope, or a valley, whether above or below sea level.

In connection with the first through fifth and seventh embodiments of the present invention (FIGS. 7-11 and 13), the insulated conductors (112, 116, 212, 216, 312, 316, etc.) may be a 14-Gauge insulated Stranded THHN Cable, Model No. 22955957, supplied by Southwire Co., Carrollton, Ga.

While the preferred embodiments of the invention have been particularly described in the specification and illustrated in the drawing, it should be understood that the invention is not so limited. Many modifications, equivalents and adaptations of the invention will become apparent to those skilled in the art without departing from the spirit and scope of the invention, as defined in the appended claims.

What is claimed is:

1. A method of generating electricity from the geomagnetic field and rotation of the earth, the earth rotating through the geomagnetic field to form a potential difference between first and second earth-bound terrestrial charged bodies, the first and the second earth-bound terrestrial charged bodies being spaced apart in a direction substantially normal to the earth's surface, said method comprising the steps of:
   (a) using a system including (i) an electrical load having a supply input and a return output, (ii) a first current path having a first end coupled to the supply input of the electrical load, and (iii) a second current path having a first end coupled to the return output of the electrical load;
   (b) coupling a second end of the first current path to the first earth-bound terrestrial charged body and coupling a second end of the second current path to the second earth-bound terrestrial charged body, such that the electrical load is electrically coupled to the first and the second earth-bound terrestrial charged bodies; and
   (c) generating in the electrical load an electrical current related to the potential difference formed between the first and the second earth-bound terrestrial charged bodies by the earth's rotation through the geomagnetic field.

2. The method of claim 1, wherein the first earth-bound terrestrial charged body includes a first portion of the earth located below the earth's surface and the second earth-bound terrestrial charged body includes a second portion of the earth located at about or near the earth's surface, and wherein the earth contains an opening extending between the first and the second portions of the earth,
   said first current path including (i) an electrically insulated conductor extending at least partially through the opening and (ii) a conductive contact member coupled to the electrically insulated conductor for establishing electrical contact between the first portion of the earth and the electrically insulated conductor.

3. The method of claim 2, wherein the electrical load is located within the opening, between the first and the second portions of the earth.

4. The method of claim 2, wherein the opening is a bore or shaft of a well or mine, the well or mine including a bottom, and wherein the first portion of the earth includes the bottom of the well or mine, said electrically insulated conductor extending through the bore or shaft and the conductive contact member establishing electrical contact between the bottom of the well or mine and the electrically insulated conductor.

5. The method of claim 4, wherein the bore or shaft is lined with a metal casing, the metal casing being in contact with the second portion of the earth and the second current path being in contact with the metal casing, such that the second current path is in electrical communication with the second portion of the earth.

6. The method of claim 1, wherein the first and the second earth-bound terrestrial charged bodies are first and second portions of the earth, respectively, located at about or near the surface of the earth, the first portion of the earth being at a first elevation and the second portion of the earth being at a second elevation, the first elevation being different than the second elevation.

7. The method of claim 1, wherein the first earth-bound terrestrial charged body is a portion of the earth at a bottom of a body of water, and wherein the second earth-bound terrestrial charged body is water at about or near the surface of the body of water.

8. The method of claim 7, wherein the body of water is a body of saltwater.

9. The method of claim 1, wherein the electrical load includes a rechargeable energy source, said method further comprising the step of
   (c) charging the rechargeable energy source with the electric current generated in step (c).

10. The method of claim 9, wherein the electrical load further includes an electric pump, said method further comprising the step of
    (d) powering the electric pump with the rechargeable energy source.

11. The method of claim 9, wherein the electrical load includes an electric motor, said method further comprising the step of
    (d) powering the electric motor with the rechargeable energy source.

12. The method of claim 1, wherein the electrical load includes an electric pump, said method further comprising the step of
   (c) powering the electric pump with the electric current generated in step (c).

13. The method of claim 1, wherein the electrical load includes an electric motor, said method further comprising the step of
   (c) powering the electric motor with the electric current generated in step (c).

14. The method of claim 1, wherein the electrical load includes a rechargeable energy source including a rechargeable battery and a charging circuit coupled to the rechargeable battery.

15. The method of claim 14, wherein the electrical load further includes an electric motor coupled to the rechargeable battery.

16. The method of claim 1, wherein the electrical load includes a rechargeable energy source including a one or more capacitors and a charging circuit coupled to the one or more capacitors.

17. The method of claim 16, wherein the one or more capacitors are one or more ultracapacitors.

\* \* \* \* \*

UNITED STATES PATENT AND TRADEMARK OFFICE
CERTIFICATE OF CORRECTION

PATENT NO. : 9,712,036 B2  
APPLICATION NO. : 14/229873  
DATED : July 18, 2017  
INVENTOR(S) : Omer Stupac Page 1 of 1

It is certified that error appears in the above-identified patent and that said Letters Patent is hereby corrected as shown below:

In the Specification

Column 20, Line 56: "(c)" should read -- (d) --.

Column 20, Line 61: "(d)" should read -- (e) --.

Column 20, Line 66: "(d)" should read -- (e) --.

Column 21, Line 4: "(c)" should read -- (d) --.

Column 21, Line 9: "(c)" should read -- (d) --.

Signed and Sealed this  
Twenty-second Day of August, 2017

Joseph Matal  
*Performing the Functions and Duties of the*  
*Under Secretary of Commerce for Intellectual Property and*  
*Director of the United States Patent and Trademark Office*